United States Patent
Hieda et al.

(12)

(10) Patent No.: US 6,448,354 B1
(45) Date of Patent: Sep. 10, 2002

(54) METHYL METHACRYLATE SYRUP AND PRODUCTION THEREOF

(75) Inventors: Shin-ichi Hieda; Tadashi Kawabata; Shojiro Kuwabara; Masahiro Kurokawa, all of Kanagawa-ken (JP)

(73) Assignee: Mitsubishi Gas Chemical, Chiyoda-ku (JP)

( * ) Notice: Subject to any disclaimer, the term of this patent is extended or adjusted under 35 U.S.C. 154(b) by 124 days.

(21) Appl. No.: 09/696,958

(22) Filed: Oct. 27, 2000

(51) Int. Cl.⁷ .......................... C08F 20/06; C08F 20/28
(52) U.S. Cl. ................ 526/319; 526/227; 526/229; 526/309; 526/323.2; 526/328.5; 526/329.2; 526/329.3; 526/329.5; 526/329.7; 526/219.6
(58) Field of Search .................. 526/227, 309, 526/323.2, 328.5, 329.2, 329.3, 329.5, 329.7, 218, 260, 229, 219.6, 319

(56) References Cited

U.S. PATENT DOCUMENTS

| | | | | |
|---|---|---|---|---|
| 4,107,135 A | * | 8/1978 | Duggins et al. | 523/451 |
| 4,152,506 A | | 5/1979 | Novak | |
| 4,214,064 A | * | 7/1980 | Kanazawa | 525/242 |
| 4,328,329 A | * | 5/1982 | Zievers | 210/679 |
| 4,588,798 A | * | 5/1986 | Heitner | 525/263 |
| 4,605,717 A | * | 8/1986 | Heitner | 525/263 |
| 4,617,367 A | * | 10/1986 | Watanabe et al. | 525/208 |
| 4,803,026 A | * | 2/1989 | Ikeda et al. | 264/216 |

FOREIGN PATENT DOCUMENTS

| | | |
|---|---|---|
| JP | 36-3392 | 4/1961 |
| JP | 40-3701 | 2/1965 |
| JP | 46-40693 | 12/1971 |
| JP | 49-104937 | 10/1974 |
| JP | 53-2189 | 1/1978 |
| JP | 55-43111 | 3/1980 |
| JP | 64-11652 | 2/1989 |
| JP | 3-111408 | 5/1991 |
| JP | 9-67495 | 3/1997 |
| JP | 9-194673 | 7/1997 |
| JP | 9-255714 | 9/1997 |
| JP | 2000309601 A | * 11/2000 |

* cited by examiner

Primary Examiner—David W. Wu
Assistant Examiner—Tanya Zalukaeva
(74) Attorney, Agent, or Firm—Antonelli, Terry, Stout & Kraus, LLP

(57) ABSTRACT

A methyl methacrylate syrup is produced by the steps of (1) preparing a starting material comprising methyl methacrylate or a monomer mixture mainly comprising methyl methacrylate, and dividing the starting material into 20 to 70% by weight of an initial charge and 30 to 80% by weight of an after-charge; (2) heating the initial charge in a reactor; (3) adding a whole protion of a chain transfer agent at the time when the initial charge reaches a reaction temperature; (4) adding the after-charge over 0.1 to 10 hours together with a polymerization initiator having a half-life of 10 to 300 seconds at the reaction temperature; (5) continuing the heating after the addition of the after-charge and the polymerization initiator is complete; and (6) adding a hindered phenol polymerization inhibitor at the time the heating is finished. The methyl methacrylate syrup thus produced is excellent in storage stability.

16 Claims, No Drawings

METHYL METHACRYLATE SYRUP AND PRODUCTION THEREOF

BACKGROUND OF THE INVENTION

1. Field of the Invention

The present invention relates to methyl methacrylate syrups containing a monomer component mainly comprising methyl methacrylate and a polymer component resulted from the polymerization of methyl methacrylate or a monomer mixture mainly comprising methyl methacrylate, and a production process thereof.

2. Description of the Prior Art

Acrylic syrups have been used as intermediate materials for methacrylic cast products, optical materials such as photo-transmitting fibers and optical wave-guide; acrylic artificial marble; artificial seal materials; floor materials; adhesives; restoration materials for cultural assets and stuffed animals; and medical materials.

Methods of producing syrups mainly comprising methyl methacrylate are described in various patent documents such as Japanese Patent Publication Nos. 36-3392, 40-3701, 46-40693 and 53-2189, and Japanese Patent Application Laid-Open Nos. 55-43111 and 9-255714. Japanese Patent Publication No. 1-11652 and Japanese Patent Application Laid-Open Nos. 49-104937, 3-111408, 9-67495 and 9-194673 disclose carboxy-functional methyl methacrylate syrups.

The production methods of acrylic syrups are classified roughly into two main methods. One is a so-called partial polymerization method where a portion of acrylic monomer is bulk-polymerized, as disclosed in Japanese Patent Publication Nos. 36-3392: and 1-11652. The partial polymerization method is sub-classified into a batch method and a continuous method. In the other method, an acrylic polymer separately prepared is dissolved in acrylic monomer, as disclosed in Japanese Patent Application Laid-Open Nos. 49-104937 and 9-194673. This method is basically different from the production method of the present invention, and is disadvantageous in view of energy consumption and production cost because an acrylic polymer separately prepared must be taken out of a production apparatus and then dissolved in acrylic monomer.

In the methods other than bulk polymerization, for example, solution polymerization and emulsion polymerization, in addition to a batch process and a continuous process, employed is a semi-batch process where a starting monomer containing a polymerization initiator is added to a solvent in portions as described in Kuwano, "Kobunshi Kako", 47(3), 125, 1998. However, the semi-batch solution polymerization requires a solution for dissolving the monomer, and the semi-batch emulsion polymerization requires a dispersion medium and an emulsifying agent. There is no report about industrial production of methyl methacrylate, syrups by non-solvent semi-batch process under high monomer concentration.

As the semi-batch partial polymerization, Japanese Patent Publication No. 36-3392 discloses a production method of methyl methacrylate syrups. In the method, after heating a starting material containing a monomer component mainly comprising methyl methacrylate and a chain transfer agent to 80° C., a small amount of azobisisobutyronitrile or benzoyl peroxide is added as a polymerization initiator to the starting mixture, and simultaneously the mixture is heated to 100° C. to conduct polymerization for 27 to 50 minutes under reflux. When reaching a predetermined viscosity, the reaction mixture is rapidly cooled by adding a cold methyl methacrylate containing hydroquinone as a polymerization inhibitor, thereby obtaining methyl methacrylate syrups.

In this method, however, since the polymerization is stopped before the polymerization initiator is completely decomposed, the polymerization initiator still remains in the syrups thus produced. Therefore, the storage stability of the syrups is poor even if the polymerization inhibitor is added. In consideration that the half-life of benzoyl peroxide used as the polymerization initiator is about 22 minutes at 100° C., about 20 to 42% of the polymerization initiator based on the total amount added remains in the reaction mixture at the time when the viscosity reaches the predetermined value. In addition, since all the amount of polymerization initiator necessary for the reaction is added in one portion, the control of the reaction is difficult. Therefore, the syrups cannot be stably produced by the proposed method.

Japanese Patent Publication No. 1-11652 discloses the production of syrups as an intermediate material for sheet molding compositions (SMC) and bulk molding compositions (BMC). In the proposed method, a starting material containing 100 parts of a; monomer mixture comprising 89% by weight of methyl methacrylate, 5% by weight of methacrylic acid and 6% by weight of trimethylolpropane trimethacrylate, 0.4 part of n-dodecylmercaptan and 0.05 part of 2,2'-azobisisobutyronitrile are charged into a reaction vessel equipped with a stirrer, a thermometer and a nitrogen inlet tube. The polymerization is conducted at 80° C. under nitrogen atmosphere. When the reaction liquid reaches the predetermined viscosity, hydroquinone and p-methoxyphenol as the polymerization inhibitor is added to the reaction liquid which is then rapidly cooled to room temperature to inhibit the polymerization, thereby producing carboxy-functional acrylic syrups.

In this method, however, since the polymerization is forced to stop by adding the polymerization inhibitor at the time when the reaction mixture reaches the predetermined viscosity, a portion of the polymerization initiator remains in the resultant syrups. Therefore, the storage stability of the syrups is poor even if the polymerization inhibitor is added. In addition, since all the amount of polymerization initiator necessary for the reaction is added in one portion, the control of the reaction is difficult. After the addition of the polymerization initiator, there is no effective means for controlling the reaction except for keeping the temperature constant. Since the slight change of the temperature, etc. largely affects the rate of polymerization and viscosity, the syrups cannot be stably produced by the proposed method.

One method of preventing the polymerization initiator from remaining in the products is to use a polymerization initiator having a short half-life at the polymerization temperature. However, this method requires a large amount of the polymerization initiator, and as a result thereof, the polymerization proceeds so rapidly that the control of the reaction becomes very difficult. Thus, the batch process faces the dilemma that usable polymerization initiator is limited to those having a long half-life at the polymerization temperature.

Japanese Patent Application Laid-Open No. 9-67495 discloses another method of producing syrups as intermediate materials for SMC and BMC. In the proposed method, a monomer mixture comprising 90 parts of methyl methacrylate and 10 parts of methacrylic acid is heated to 90° C. under nitrogen atmosphere, and then, 0.05 part of 2,2'-azobisisobutyronitrile as the polymerization initiator and 0.8 part of n-dodecylmercaptan as the chain transfer agent are added to conduct the polymerization. The reaction mixture is rapidly cooled by adding 50 parts of methyl methacrylate at the time when the reaction mixture reaches the predetermined viscosity, thereby obtaining methyl methacrylate syrups containing carboxy-functional polymers.

In this method, however, since the polymerization is forced to stop by rapid cooling with the addition of the monomer at the time when the reaction mixture reaches the predetermined viscosity, a portion of the polymerization initiator remains in the resultant syrups. Therefore, the storage stability of the syrups is poor. In addition, since all the amount of polymerization initiator necessary for the reaction is added in one portion, the control of the reaction is difficult. After the addition of the polymerization initiator, there is no effective means for controlling the reaction except for keeping the temperature constant. Since the slight change of the temperature, etc. largely affects the rate of polymerization and viscosity, the syrups cannot be stably produced by the proposed method.

As mentioned above, in the known batch process, the control of the reaction is difficult because a required amount of the polymerization initiator is all added in one portion. After the addition of the polymerization initiator, there is no effective means for controlling the reaction except for keeping the temperature constant. Since the slight change of the temperature, etc. largely affects the rate of polymerization and viscosity, the syrups with stable quality cannot be produced by the proposed method. In addition, since the polymerization initiator remains in the syrups, the storage stability is poor even if a polymerization inhibitor is added.

When a polymerization initiator having a short half-life at the reaction temperature is used to prevent the polymerization initiator from remaining in the product, a large portion thereof is decomposed simultaneously to proceed the polymerization rapidly, thereby making the control of the polymerization difficult. Therefore, the polymerization initiator usable in the batch process is limited to those having a long half-life at the polymerization temperature. However, this in turn makes the polymerization initiator unavoidably remaining in the syrups to deteriorate the storage stability thereof even if a polymerization inhibitor is added.

As a continuous partial polymerization, Japanese Patent Publication No. 40-3701 discloses a method of continuously producing methyl methacrylate syrups by continuously supplying into a reactor methyl methacrylate dissolving 0.1% by weight of benzoyl peroxide as the polymerization initiator while taking a part of the reaction mixture out of the reactor.

However, this continuous method using a perfect mixing reactor is not suitable for a small-amount production of various types of syrups for variant applications although it is suitable for a mass production of limited types of syrups for continuous cast board.

It has been known that mercaptans accelerates the polymerization. For example, Japanese Patent Publication No. 46-40693 discloses a method of producing methyl methacrylate syrups by a partial polymerization at 65 to 105° C. in the presence of, as a chain transfer agent, an active hydrogen-containing sulfur compound such as mercaptans instead of using a polymerization initiator.

However, a large amount of the chain transfer agent is required to attain the intended polymerization rate, thereby failing to obtain methyl methacrylate syrups containing a polymer having a high molecular weight. To obtain methyl methacrylate syrups containing a polymer having a high molecular weight, the reaction should be continued for a long period of time using a small amount of the chain transfer agent. Thus, both the methods are not suitable for practical use.

As a method of deactivating the mercaptan compound remaining unreacted after the polymerization in the presence of a polymerization initiator and a mercaptan chain transfer agent, Japanese Patent Publication No. 53-2189 proposes to add, based on the mercaptan compound, 0.3 to 5 equivalents of maleic anhydride and 0.01 to 1 equivalent of at least one compound selected from a basic compound such as amine compound, a diaza compound and a triazole compound at 10 to 90° C. in the production of methyl methacrylate syrups for use as a casting material. However, since the addition is made during cooling or after cooling, the process becomes complicated, and the products made of the methyl methacrylate syrups are colored due to the nitrogen-containing basic compound. Thus, the proposed method is not practical.

Japanese Patent Application Laid-Open No. 55-43111 discloses a method of deactivating the mercaptan compound remaining in methyl methacrylate syrups by adding 0.0002 to 4.0 parts by weight a basic organic compound per 100 parts by weight methyl methacrylate syrups while 0.5% by weight or more of acrylate remains unreacted. Like the above method, since the addition is made during cooling or after cooling, the process becomes complicated, and the products made of the methyl methacrylate syrups are colored due to the nitrogen-containing basic organic compound. Thus, the proposed method is not practical.

In the method disclosed in Japanese Patent Application Laid-Open No. 9-255714, the mercaptan compound is deactivated by adding vinyl ether and/or vinyl thioether to methyl methacrylate syrups containing a carboxy-functional polymer which is produced by a partial polymerization in the presence of the mercaptan compound. However, since the addition is made after the completion of the polymerization, the process becomes complicated, and the products made of the methyl methacrylate syrups have a poor weathering resistance due to the remaining vinyl ether and/or vinyl thioether. The adducts between the mercaptan compound and the vinyl ether and/or vinyl thioether are thermally instable, and therefore, the adducts are decomposed to the mercaptan compound and the vinyl ether and/or vinyl thioether during the heating in the production of artificial marble and cast board from the methyl methacrylate syrups, thereby strictly limiting the molding conditions.

As mentioned above, the known deactivation methods of the remaining mercaptan compound by adding :respective compounds after the polymerization in the presence of a polymerization initiator and a mercaptan chain transfer agent are not suitable for practical use, because the process is complicated due to the additional step of adding the deactivating compound after the polymerization is completed, and because the resultant methyl methacrylate syrups have a poor quality due to the detrimental coloration and deterioration in weather resistance.

In the known batch-wise polymerization, the polymerization is conducted at a temperature lower than the boiling point of the mixture in the polymerization system. Although the temperature change may be expected to be minimized in the polymerization at the boiling point of the mixture in the polymerization system, the problem;s such as liquid surface rise by foaming and creation of products adhesive to reactor wall induced by the surface rise occur with increasing viscosity as the polymerization is proceeded. These problems become serious in a large reactor, because the area of the liquid surface is small for the volume of the reaction liquid. Therefore, the polymerization at the boiling point has been recognized as impractical.

To solve the above problems, Japanese Patent Application Laid-Open No. 53-24380 proposes to polymerize or copolymerize a monomer mixture containing methyl methacrylate in 70% by weight or more in the presence of 1 to 10,000 ppm of organosiloxanes. However, as described in the document, the organosiloxanes are basically incompatible with acrylic monomers and polymers, and makes the resultant molded articles cloudy. In addition, the organosiloxane bloomed into the surface of molded article causes cissing of paint or adhesion of dusts. Therefore, the use of the organosiloxanes requires careful considerations.

As a continuous partial polymerization, Japanese Patent Application Laid-Open No. 3-111408 discloses a polymerization method where the concentration of dissolved oxygen in the starting material is held less than 1 ppm, and the polymerization is conducted at 130 to 160° C. while preventing the reaction mixture from boiling so as to attain a polymerization rate of 45 to 70%. In this continuous method in a perfect mixing reactor, the dissolved oxygen should be removed from the starting material and the polymerization should be conducted under nitrogen atmosphere using a large amount of nitrogen.

In addition, the continuous method in a perfect mixing reactor is not suitable for a small-amount production of various types of syrups for variant applications although it is suitable for a mass production of limited types of syrups for continuous cast board.

As mentioned above, in the polymerization of a monomer mixture mainly comprising methyl methacrylate, the removal of dissolved oxygen has been widely performed by introducing an inert gas such as nitrogen into the monomer mixture.

It has been known that oxygen acts in polymerization as either a polymerization inhibitor or a polymerization initiator. For example, J. C. Bevington, tranlated by Takayuki Otsu, et al., "Radical Polymerization", Tokyo Kagaku Dojin, 1966, pp. 182–183 teaches that a polymer radical highly reactive with oxygen forms a peroxy radical by the addition reaction, and oxygen, in most cases, inhibits the polymerization because the reaction rate between the peroxy radical and a monomer is very low.

Matsumoto et al., "Polymer Chemistry", 26, 1969, pp. 180–186 teaches that a purified monomer reacts with oxygen to form a peroxide, and particularly, a hydroxy peroxide initiates the polymerization by generating radicals as in the case of typical polymerization initiator, and that oxygen, if present in a large concentration, Inhibits the polymerization of monomer by reacting with a monomer to give a copolymer.

Thus, the oxygen dissolved in the monomer reacts with the monomer to form a peroxide or copolymer, thereby inhibiting the polymerization or, on the contrary, initiating the polymerization according to the conditions such as temperature and oxygen concentration. This means that the dissolved oxygen makes the polymerization process unsteady.

Therefore, to polymerize a monomer mixture mainly comprising methyl methacrylate stably in industrial scale, it is important to remove the dissolved oxygen to such a level that the polymerization is not substantially affected by oxygen.

Like the batch process, it is also required in the semi-batch process to remove the dissolved oxygen to such a level that the polymerization is not substantially affected by oxygen This requires the use of a large amount of nitrogen to result in increase of the production costs. Therefore, it is demanded to develop a low-cost method free from the above factors inhibiting the polymerization.

SUMMARY OF THE INVENTION

Accordingly, an object of the present invention is to solve the above problems in the known methods and to provide a method for efficiently and easily producing methyl methacrylate syrups. Another object of the present invention is to provide a methyl methacrylate syrup suitable for various applications and having a stable quality which cannot be attained by the known batch or continuous process As a result of extensive study, the inventors have found a method which is capable of efficiently and easily producing methyl methacrylate syrups suitable for various applications and having a stable quality, and accomplished the present invention.

Thus, in a first aspect of the present invention, there is provided a method for producing a methyl methacrylate syrup having a viscosity of 10 to 500,000 mPa·s at 25° C. and containing a polymer having a weight average molecular weight of 20,000 to 500,000 when measured by gel permeation chromatography, the method comprising the steps of (1) preparing a starting material comprising methyl methacrylate or a monomer mixture mainly comprising methyl methacrylate, and dividing the starting material into 20 to 70% by weight of an initial charge and 30 to 80% by weight of an after-charge; (2) heating the initial charge in a: reactor; (3) adding a whole protion of a chain transfer agent at the time when the initial charge reaches a reaction temperature; (4) adding the after-charge over 0.1 to 10 hours together with a polymerization initiator having a half-life of 10 to 300 seconds at the reaction temperature; (5) continuing the heating after the addition of the after-charge and the polymerization initiator is completed; and (6) adding a hindered phenol polymerization inhibitor at the time the heating is finished.

The chain transfer agent may be added after replacing the dissolved oxygen with inert gas by contacting the starting monomer with the inert gas and heating the mixture in the reaction system to its boiling point to start reflux. Alternatively, the chain transfer agent may be added after heating the initial charge to the boiling point of the mixture in the reaction system within two hours to start reflux. The initial charge may be heated after adding an anti-foaming agent.

In a second aspect of the present invention, there is provided a methyl methacrylate syrup produced in the presence of an anti-foaming agent, which comprises (A) 39 to 90% by weight of a monomer component mainly comprising methyl methacrylate; (B) 9 to 60% by weight of a polymer component derived from methyl methacrylate or a monomer mixture mainly comprising methyl methacrylate, the polymer component having a weight average molecular weight of 20,000 to 500,000 when measured by gel permeation chromatography; (C) 0.0005 to 3.0% by weight of at least one chain transfer agent selected from the group consisting of mercaptans having 4 to 20 carbon atoms; (D) 0.0001 to 0.3% by weight of at least one anti-foaming agent selected from the group consisting of partially esterified compounds derived from aliphatic carboxylic acids having1 to 30 carbon atoms and glycerin and polymers derived from a monomer mixture mainly comprising butadiene; and (E) 0.001 to 1.0% by weight of a hindered phenol polymerization inhibitor, the total of the percentages adding up to 100% by weight.

DETAILED DESCRIPTION OF THE INVENTION

The production method of methyl methacrylate syrups of the present invention and a novel methyl methacrylate syrup will be described in more detail below.

In the production method of the present invention, used as the starting material is methyl methacrylate or a monomer mixture mainly comprising methyl methacrylate. The monomer mixture may contain a comonomer copolymerizable with methyl methacrylate in an amount of less than 50% by weight, preferably 45% by weight or less, and more preferably 40% by weight or less.

The comonomer usable in the present invention is not strictly limited so long as it is copolymerizable with methyl methacrylate, and may be at least one compound having an ethylenically unsaturated double bond which is selected from the group consisting of an unsaturated carboxylic acid such as acrylic acid, methacrylic acid, maleic acid and fumaric acid; an ester of an unsaturated carboxylic acid other than methyl methacrylate; an unsaturated nitrile; an unsaturated carboxylic nitrile, an, unsaturated carboxylic amide; an unsaturated carboxylic imide; an unsaturated carboxylic anhydride; an aromatic vinyl compound such as styrene; and a vinyl carboxylate such as vinyl acetate. The method of the present invention can give either a methyl methacrylate syrup containing only methyl methacrylate as the monomer component or a methyl methacrylate syrup further containing a comonomer mentioned above.

A methyl methacrylate syrup produced from only methyl methacrylate as the monomer is applicable to cast board, photo-transmitting fibers or optical wave-guide utilizing excellent optical properties of poly(methyl methacrylate).

A methyl methacrylate syrup produced form a monomer mixture containing an unsaturated carbokylic acid is applicable to the use utilizing the reaction of carboxylic acids, such, as compounds for manufacturing artificial marble (BMC or SMC) and adhesives.

In the present invention, when a comonomer such as an unsaturated carboxylic acid is used, at least a portion thereof is preferably and more preferably a whole portion thereof is charged into a reactor prior to the initiation of the polymerization By increasing the initial concentration of the comonomer such as unsaturated carboxylic acid in the initial charge, the comonomer can be effectively co-polymerized with methyl methacrylate.

In the present invention, the starting material (methyl methacrylate or a monomer mixture of methyl methacrylate and a comonomer) is divided into an initial charge and an after-charge. A portion of the starting material (initial charge) is heated in a single reactor to a reaction temperature, and a whole amount of a chain transfer agent is added at the time when the initial charge reaches the reaction temperature. Then, the polymerization is conducted in semi-batch wise manner by adding the rest of the starting material (after-charge) and a specific polymerization initiator continuously or with several portions at a constant rate. After the completion of the addition, the heating is continued for a predetermined period of time, and then, a specific polymerization inhibitor is added thereby obtaining a methyl methacrylate syrup.

(1) Heating of Initial Charge

In the present invention, as briefly described above, the starting material is divided into the initial charge, i.e., a part of the starting material charged into at an initial stage of the process, and the after-charge, i.e., the rest of the starting material which is added to the reactor together with the polymerization initiator at a later stage of the process. The weight ratio of the initial charge and after-charge is 20:80 to 70:30, preferably 25:75 to 67:33, and more preferably 30:70 to 65:35. An initial charge of less than 20% by weight of the starting material is not preferred because, although depending on the type of reactor, a substantial portion of stirring blades is positioned above the liquid surface to result in a poor stirring efficiency.

After charged into a reactor, the initial charge is heated to the reaction temperature (polymerization temperature) which is usually set at 95 to 110° C. under atmospheric pressure, preferably at the boiling point of the mixture in the reaction system.

In the present invention the initial charge may be heated after releasing the dissolved oxygen therefrom by contact with an inert gas in an amount of 200 to 1000 vol. % based on the amount of the initial charge. With this initial releasing treatment, the polymerization can be effected by continuing the reflux at the boiling point of the mixture in the reaction system containing substantially no oxygen even if the after-charge is not contacted with an inert gas. An amount of less than 200 vol. % cannot remove the dissolved oxygen sufficiently. The inert gas may be used in an amount of larger than 1000 vol. %, but not economical because it merely increases the consumption of the inert gas without no additional effect. The inert gas is contacted with methyl methacrylate or the monomer mixture by a vapor-liquid contact or vapor-liquid separation method utilizing bubbling, atomizing or motionless mixer.

In place of heating after removing the dissolved oxygen by inert gas, the initial charge may be heated from room temperature to the boiling point of the reaction mixture in the system within two hours, preferably one and half hours. More preferably, the time required for reaching the boiling point from 70° C. is within a half hour. After such a heat treatment, the polymerization can be effected by continuing the reflux at the boiling point of the mixture in the system containing substantially no oxygen. Therefore, the operation for removing the dissolved oxygen in the starting material by using inert gas can be omitted, this being advantageous in view of production costs.

Thus, the process of the present invention is preferably carried out by reducing the oxygen concentration in the reaction system to 3 ppm or less.

During the above heating step, a commercially available polymerization inhibitor may be present in the initial charge in an amount of 3 to 1000 ppm. Generally, since the amount of the dissolved oxygen in the initial charge at room temperature is relatively large, the polymerization is likely to occur during the heating step. A small amount of the polymerization inhibitor prevents such undesirable premature polymerization during the heating step. Although the amount of the dissolved oxygen decreases with increasing temperature, the dissolved oxygen is likely to initiate the polymerization when keeping the system mixture at 70° C. or higher for a long period of time. Therefore, as described above, the time required for reaching the boiling point from 70° C. is preferably set within 0.5 hour.

The initial charge may be heated to the boiling point of the system mixture after adding an anti-foaming agent. The anti-foaming agent is selected from the compounds which do not adversely affect the polymerization and the quality of the final products; which inhibit the foam-stabilizing substances; which allow the foam in the reaction liquid to be degassed easily; which break the foam in the reaction liquid surface; and which reduce the viscosity of the reaction liquid. For example, the compounds described in "Additives for Plastics" published by BYK Chemie Japan Co., Ltd. and "Kao Lubricants for Plastics" published by Kao Corporation are usable as the anti-foaming agent, which includes a partial ester of $C_1$–$C_{30}$ fatty acid and glycerin such as caprylic monoglyceride, lauric monoglyceride, myristic monoglyceride, palmitic monoglyceride, linolenic ionoglyceride, oleic monoglyceride, stearic monoglyceride and behenic monoglyceride; a polymer derived from a monomer mixture mainly comprising butadiene such as butadiene rubber, nitrile rubber, styrene-butadiene rubber and styrene-butadiene-styrene elastomer; and a mixture thereof.

To ensure the effect of using the anti-foaming agent, it is added 0.0001 to 0.3% by weight based on the total amount of the starting material. The addition amount exceeding 0.3% by weight produces no additional anti-foaming effect.

The anti-foaming agent prevents the foams from being included in the final products and facilitate the defoaming during the molding step. Therefore, appearance defective and physical defective can be reduced in the final products such as cast boards, optical materials such as photo-transmitting fibers and optical wave-guide; acrylic artificial marble; artificial seal materials; floor materials; adhesives; restoration materials for cultural assets and stuffed animals; and medical materials.

(2) Addition of Chain Transfer Agent

The chain transfer agent is added after the temperature of the initial charge reaches the reaction temperature, preferably at the time when the temperature reaches the boiling point of the system mixture and the reflux is started. The chain transfer agent is not strictly limited as far as it does not inhibit the polymerization and gives a product having intended molecular weight. Preferred chain transfer,agent is at least one mercaptan having 4 to 20 carbon atoms such as 1-butanethiol, 2,2-dimethlethanethiol, 1-octanethiol, 2,2-dimethylhexanethiol, 1-dodecanethiol, 2,2-dimethyldecanethiol, 1-hexadecanethiol, 1-octadecanethiol, benzenethiol, thiocresol and thionaphthol.

As described above, it has been known that a mercaptan used as the chain transfer agent promotes the bulk polymerization. If the initial charge is heated in the presence of a mercaptan, premature polymerization occurs according to the heating conditions before the addition of the after-charge and the polymerization initiator, thereby changing the polymerization rate to result in failure of stable production. If the chain transfer agent is added simultaneously with the after-charge and the polymerization initiator, the polymerization due to the redox reaction between the polymerization initiator and the chain transfer agent is likely to occur. In addition, the proportion of the chain transfer agent remaining not consumed in the reaction is increased as compared with the addition before adding the after-charge and the polymerization initiator. Therefore, a large amount of the chain transfer agent is required for attaining intended molecular weight, this being economically disadvantageous.

The addition amount of the chain transfer agent is preferably 0.0005 to 3.0% by weight, more preferably 0.03 to 1.5% by weight based on the total charge (initial charge+after-charge).

(3) Addition of After-charge and Polymerization Initiator

After the addition of the chain transfer agent, the after-charge and the polymerization initiator are added to the reactor while maintaining the temperature of the system mixture at the reaction temperature, preferably maintaining the reaction temperature at the boiling point of the system mixture to continue the reflux, thereby polymerizing methyl methacrylate and, if used, a comonomer.

As mentioned above, the weight ratio of the initial charge and the after-charge is 20:80 to 70:30, preferably 25:75 to 67:33, and more preferably 30:70 to 65:35. When the after-charge is less than 30% by weight of the total starting material, the evolved polymerization heat is difficult to be removed by the addition of the after-charge, and the evolved heat becomes the maximum level just after beginning the addition of the after-charge due to a high monomer concentration. When the after-charge is more than 80% by weight of the total starting material, the excessive evolution of heat just after the addition can be avoided. However, the evolution of heat becomes the maximum level at the time of completing the addition of the after-charge because the monomer concentration becomes highest just before the completion of the addition. In either cases, the amount of evolved heat changes largely during the addition. As a result, the refluxing amount also changes largely during the polymerization at the boiling point to make the stable operation difficult, and the reaction temperature is difficult to be controlled at constant level by a jacket during the polymerization at a temperature below the boiling point. For the above reason, the weight ratio of the initial charge and the after-charge is preferred to be within the above range to maintain the refluxing amount constant throughout the addition when a polymerization rate of 15 to 50% is intended.

The feeding rate of the after-charge is controlled nearly constant throughout the addition. The addition is completed within 0.1 to 10 hours, preferably 0.5 to 8 hours, and more preferably 1 to 6 hours. The addition within a time shorter than 0.1 hour results in a large evolved heat, and requires a heat exchanger with large capacity and a large-flow constant delivery pump. The addition over a period of longer than 10 hours disadvantageously prolongs the time taken from the charge of the starting material until the product is taken out, thereby reducing the productivity.

The polymerization initiator is added continuously or with several portions at a constant rate. Like the addition of the after-charge, the polymerization initiator is added lover 0.1 to 10 hours, preferably 0.5 to 8 hours, and more preferably 1 to 6 hours. The polymerization initiator may be added in the form of solution in the after-charge. The half-life of the polymerization initiator at the reaction temperature is 10 to 300 seconds, preferably 15 to 120 seconds to minimize the polymerization after the completion of the addition. When the half-life is shorter than 10 seconds, a large amount of the polymerization initiator is required because a substantial part thereof is decomposed before the after-charge and/or the polymerization initiator are sufficiently mixed with the mixture in the reactor. The use of a large amount of the polymerization initiator causes unfavorable coloration of the products due to the polymerization initiator itself or impurities contained therein. When the half-life is longer than 300 seconds, it takes a long period of time for the polymerization inhibitor remaining at the completion of the addition to disappear by decomposition, and the batch wise polymerization proceeds further. This results in the change of the polymerization rate and viscosity due to temperature variation after the completion of the addition, thereby failing to obtain products with stable quality. The half-life can be easily determined by the various constants described in "Organic Peroxides", 13th edition, published by NOF Corporation, technical report published by Atochem Yoshitomi Co. Ltd., "Azo Polymerization Initiators" published by Wako Junyaku Kogyo Co. Ltd, etc. For example, usable polymerization initiator in the polymerization at about 100° C. may be 2,2'-azobisisobutyronitrile, 2,2'-azobis(2,4-dimethylvaleronitrile), 2,2'-azobis(2,4-dimethyl-4- methoxyvaleronitrile), 1,1'-azobiscyclohexanecarbonitrile, lauroyl peroxide, benzoyl peroxide, t-butyl peroxypivalate, t-butyl peroxy-2-ethylhexanoate, t-amyl peroxy-2-ethylhexanoate, diisopropyl peroxydicarbonate or bis(4-t-butylcyclohexyl) peroxydicarbonate.

These polymerization initiators may be used alone or in combination of two or more in an amount required for attaining intended polymerization rate. The polymerization initiator may be added separately with the after-charge or together with the after-charge as a mixture. Although the viscosity of the methyl methacrylate syrups depends on the polymerization rate, the molecular weight of the polymer, the fraction of the unsaturated monomer copolymerizable with methyl methacrylate, etc., the addition amount of the polymerization initiator is preferably $5 \times 10^{-5}$ to 2% by weight, more preferably $5 \times 10^{-4}$ to 1% by weight based on the total amount of the starting material to ensure the intended viscosity range.

The addition of the after-charge and the polymerization initiator is started at the appropriate stage, preferably 0 to 60 minutes and more preferably 0 to 15 minutes after the completion of the addition of the chain transfer agent.

The polymerization is preferably 95 to 110° C. under atmospheric pressure, and more preferably the boiling point of the mixture in the reaction system. The polymerization heat can be removed by sensible heat or vaporization latent heat. The sensible heat can be set in a wide range by conducting the polymerization at 110 to 180° C. The polymerization heat may be removed by a jacket attached to a reactor, but there is a fear of adhesion of scales to the reactor wall. Therefore, the jacket is rather preferred to be used only for keeping the temperature constant. The polymerization may be carried out at 180° C. or higher, but oligomers are unfavorably by-produced in an increased amount. In the polymerization at 80° C. or lower, the sensible heat and vaporization latent heat cannot be set in wider range. In addition, the viscosity of the mixture in the reaction system increases, and the influence of gel effect becomes unfavorably large even when the polymerization rate is relatively low.

It has been known in the art that a polymerization acceleration effect called as gel effect is observed in the polymerization of methyl methacrylate. This effect makes, particularly in batch wise polymerization, the control of the reaction difficult. The present invention has the following three advantages as compared with the batch wise polymerization. First, since the polymerization initiator is not added at once but added by portions and the half-life thereof at the reaction temperature is as short as 10 to 300 seconds, the radical concentration in the reaction system can be kept at extremely low level throughout the addition thereof. Therefore, even if the polymerization is abnormally accelerated for some reasons, a further progress of the polymerization can be minimized by discontinuing the addition of the starting material, thereby making it possible, to carry out the polymerization safely. Second, at least a part of the polymerization heat can be removed by the sensible heat by adding the starting monomer (after-charge) not at once but by portions. Third, the half-life at the reaction temperature is as short as 10 to 300 seconds, the polymerization initiator remains in extremely low concentration, and after the polymerization it rapidly disappear by decomposition. With the above three advantages, the reaction is easily controlled and a runaway progress of: the polymerization can be avoided in the present invention, and therefore, the methyl methacrylate syrups are produced under safe and stable conditions.

In the present invention, oxygen is preferably removed from the reaction system by continuing the reflux in a refluxing amount of 0.01 to 10 parts by weight per minute based ion 100 parts by weight of the liquid mixture in the reactor. When the refluxing amount per minute is less than 0.01 part by weight, oxygen accompanied by the addition of the after-charge cannot be sufficiently removed from the reaction system, thereby failing to achieve the intended polymerization rate. A refluxing amount per minute exceeding 10 parts by weight means a violent polymerization or an excessive heat supply from a jacket. In the former case, the polymerization is uncontrollable, and the energy efficiency is poor in the later case.

(4) Heating after Addition

After the addition of the after-charge and the polymerization initiator is completed, it is preferable to continue the heating of the reaction mixture to maintain the refluxing state for a period of time sufficient for decomposing 99% by weight or more of the polymerization initiator used in the reaction, preferably for 0.01 to 10 hours, and more preferably 0.05 to 5 hours. If the polymerization initiator remains after the completion of the polymerization, the steady production of the methyl methacrylate syrups is difficult due to the change of the polymerization rate and the viscosity during the cooling step. Also, the storage stability of the obtained methyl methacrylate syrups is deteriorated. Although the heating may be continued beyond 10 hours, the time taken from the charge of the starting material until the products are taken out is prolonged to reduce the Productivity. The final polymerization rate is 15 to 50% by weight, although depending on the intended molecular weight and the concentration of the unsaturated carboxylic acid being optionally used.

(5) Addition of Polymerization Inhibitor

After continuing the heating for a limited period of time, the reaction mixture is preferably added with the polymerization inhibitor and cooled, and then the products are taken out. By adding the polymerization inhibitor at the time of finishing the heating, the :progress of the polymerization due to the mercaptan during the cooling operation can be prevented to ensure the safe and steady production of the methyl methacrylate syrups. In addition, the storage stability of the methyl methacrylate syrups is enhanced even when a mercaptan is used as the chain transfer agent, and therefore the deactivating treatment of the mercaptan remaining in the methyl methacrylate syrups can be omitted.

To avoid the coloration of the obtained syrups, a hindered phenol is preferably used as the polymerization inhibitor. Examples thereof include 2,6-di-t-butyl-4-methylphenol, 6-t-butyl-2,4-dimethylphenol, 4,4'-thiobis(6-t-butyl-3-methylphenol) and 2,2'-methylenebis(4-methyl-6-t-butylphenol). These hindered phenol polymerization inhibitors may be used alone or in combination of two or more. The addition amount of the hindered phenol polymerization inhibitor is preferably 0.001 to 1.0% by weight, more preferably 0.005 to 0.3% by weight based on the total amount of the starting material. In addition to the hindered phenol polymerization inhibitor, a polymerization inhibitor, such as a phosphorus polymerization inhibitor, which is known to prevent coloration in cooperation with the hindered phenol may be used in an amount of 0.001 to 0.1% by weight biased on the hindered phenol polymerization inhibitor.

In the cooling step, it is preferred to introduce an oxygen-containing gas such as air and a mixed gas of air an d nitrogen into the reaction mixture. By dissolving a sufficient amount of oxygen into the syrups in the presence of the hindered phenol, the storage stability of the methyl methacrylate syrups can be further improved.

The methyl methacrylate syrups produced by the above process is characterized by having a viscosity of 10 to 500,000 mPa·s, preferably 200 to 100,000 mPa·s at 25° C. and containing a polymer (methyl methacrylate polymer and/or methyl methacrylate copolymer) having a weight average molecular weight of 20,000 to 500,000, preferably 30,000 to 400,000 when measured by gel permeation chromatography (GPC).

The methyl methacrylate syrups produced by the method of the present invention generally have the following composition:

(A) 39 to 90% by weight of a monomer component mainly comprising methyl methacrylate;

(B) 60 to 9% by weight of a polymer component derived from methyl methacrylate or a monomer mixture mainly comprising methyl methacrylate;

(C) 0.0005 to 3.0% by weight of at least one chain transfer agent; and (D) 0.001 to 1.0% by weight of at least one hindered phenol polymerization inhibitor. The percentages of (A) to (D) add up to 100 percent by weight.

In particular, the methyl methacrylate syrups produced by using the anti-foaming agent have the following composition:

(A) 39 to 90% by weight of a monomer component mainly comprising methyl methacrylate;

(B) 9 to 60% by weight of a polymer, component derived from methyl methacrylate or a monomer mixture mainly comprising methyl methacrylate and having a weight average molecular weight of 20,000 to 500,000 when measured by GPC;

(C) 0.0005 to 3.0% by weight of at least one chain transfer agent;

(D) 0.0001 to 0.3% by weight of at least one anti-foaming agent; and (E) 0.001 to 1.0% by weight of at least one hindered phenol polymerization inhibitor. The percentages of (A) to (E) add up to 100 percent by weight.

The obtained methyl methacrylate syrups may be used as intermediate material for manufacturing cast products, optical materials such as photo-transmitting fibers and optical wave-guide; acrylic artificial marble; artificial seal materials; floor materials; adhesives; restoration materials for cultural assets and stuffed animals; and medical materials. The methyl methacrylate syrups may contain, if desired, one or more known additives such as fillers, fiber reinforcements, shrinkage controlling agents, lubricants, plasticizers, thickening agents, diluents such as organic solvent, crosslinking agents, leveling agents, defoaming agents, anti-settling agents, releasing agents, antioxidants, polymerization inhibitors, UV absorbers, pigments and dyes.

The present invention will be explained in more detail by reference to the following examples which should not be construed to limit the scope of the present invention.

The polymerization rate was determined by gravimetric method after purifying and vacuum-drying the precipitates formed by pouring a sample into a large amount of cold hexane. The molecular weight of the polymer in the syrup was measured by a gel permeation chromatograph type 8010 manufactured by Tosoh Corporation. The acid value was determined by titrating a 10% sample solution in methylene chloride with a 0.05 mol/liter ethanolic solution of potassium hydroxide using phenolphthalein as indicator. The viscosity was measured by a type B viscometer at 25° C.

In the following examples and comparative examples, methyl methacrylate type F containing 5 ppm 6-t-butyl-2, 4-dimethyphenol (product of Mitsubishi Gas Chemical Company, Inc.), methacrylic acid containing 250 ppm 4-methoxyphenol (product of Mitsubishi Gas Chemical Company, Inc.) and methyl acrylate containing 15 ppm 4-methoxyphenol (product of Toagosei Co., Ltd.) were used.

EXAMPLE 1

Into a 3-liter separable flask equipped with a stirrer, a condenser and a constant delivery pump, 930 g of methyl methacrylate and 9.4 g of methacrylic acid were charged and heated. When the temperature reached 100° C., 11.3 g of 1-dodecanethiol were added, and then, a solution comprising 940 g of methyl methacrylate dissolving 0.14 g of 2,2'-azobis(2,4-dimethylvaleronitrile) having a half-life of 96 seconds at 100° C. was added over three hours by the constant delivery pump. After the addition, the heating was continued for one hour and hen finished, followed by the addition of 2.98 g of 2,6-di-t-butyl-4-methylphenol and the subsequent cooling to room temperature. The polymerization rate was 35.1%. The acid value of the obtained syrup was 2.5 mgKOH/g.

The syrup was poured into a cold hexane, and the precipitated polymer was purified and vacuum-dried. The acid value of a 10% solution of the dried polymer in methylene chloride was 3.5 mgKOH/g, while the acid value of the solvent methylene chloride was 0.001 mgKOH/g or less.

The weight average molecular weight of the polymer in the syrup was 51,000 when measured by GPC, and the viscosity of the syrup was 2100 mPa·s at 25° C. The syrup was stored in the dark at 40° C. for one month. The viscosity at 25° C. of the syrup after the storage was 2200 mPa·s and no color change was noticed.

REFERENCE EXAMPLE 1

The methyl methacrylate syrup (1 kg) obtained in Example 1 was kneaded with 1.8 kg of aluminum hydroxide (average particle size: 20 μm), 0.2 kg of glass frit, 7 g of magnesium oxide, 50 g of trimethylolpropane trimethacrylate, 10 g of t-butylperox,y(2-ethylhexanoate), 10 g of zinc stearate and 5 g of 2-(5-methyl-2-hydroxyphenyl)benzotriazole (Tinuvin P, product of Japan Ciba-Geigy) at 30° C. for first one hour and then at 40° C. The mixture began to thicken just after the kneading, and showed no tackiness after three hours of kneading.

After aging at 40° C. for 24 hours, the compound thus obtained was press-molded under a pressure of 3.0 MPa for three minutes and then 10.0 MPa for three minutes at an upper surface temperature of 115° C. and a bottom surface temperature of 130° C. to obtain an artificial marble plate with a good surface smoothness. After storage at 40° C. for ten days, the compound was molded in the same manner to obtain, an artificial marble plate with the same surface smoothness.

EXAMPLES 2 to 5

By repeating the procedures of Example 1 under the conditions shown in Table 1, respective methyl methacrylate syrups were prepared. The syrups of Examples 2 to 4 were evaluated in the same manner as in Reference Example 1. After three hours of kneading, any of the syrups thickened sufficiently to obtain compounds with no tackiness.

REFERENCE EXAMPLE 2

The methyl methacrylate syrup of Example 5 (1 kg) was mixed with 2 g of lauroyl peroxide and deaerated. The mixture was injected into a space defined by a pair of opposing tempered glass plates of 300×300×10 mm and polyvinyl chloride gasket disposed between the glass plates. The mixture was allowed to polymerize at 55° C. for two hours, 60° C. for two hours, 65° C. for two hours and 135° C. for 0.25 hour, then cooled at 70° C. A colorless transparent methacrylate plate with good appearance was obtained.

COMPARATIVE EXAMPLE 1

In the same manner as in Example 1 except for using 0.09 g of t-butylperoxy(2-ethylhexanoate) having a half-life of 1550 seconds at 100° C. as the polymerization initiator, a syrup was prepared. The polymerization rate after one hour of the addition was 35.0%. The acid value of the obtained syrup was 2.5 mgKOH/g.

The syrup was poured into a cold hexane, and the precipitated polymer was purified and vacuum-dried. The acid value of a 10% solution of the dried polymer in methylene chloride was 3.5 mgKOH/g, while the acid value of the solvent methylene chloride was 0.001 mgKOH/g or less.

The weight average molecular weight of the polymer was 51,000 when measured by GPC, and the viscosity Of the syrup was 2100 mPa·s at 25° C.

When stored in the dark at 40° C. for one month, the syrup was entirely solidified.

COMPARATIVE EXAMPLE 2

In the same manner as in example 1 except for using no polymerization inhibitor, a syrup was prepared. The polymerization rate was 35.1%. The acid value of the obtained syrup was 2.5 mgKOH/g.

The syrup was poured into a cold hexane, and the precipitated polymer was purified and vacuum-dried. The acid value of a 10% solution of the dried polymer in methylene chloride was 3.5 mgKOH/g, while the acid value of the solvent methylene chloride was 0.001 mgKOH/g or less.

The weight average molecular weight of the polymer was 51,000 when measured by GPC, and the viscosity of the syrup was 2100 mPa·s at 25° C.

When stored in the dark for one month at 40° C., about lower three quarters of the syrup were solidified.

COMPARATIVE EXAMPLE 3

The starting material comprising 1870 g of methyl methacrylate and 9.4 g or methacrylic acid was all charged at once and heated under stirring. When the temperature reached 80° C., 29.1 g of 1-dodecanethiol and 0.25 g of 2,2'-azobisisobutyronitrile having a half-life of 5230 seconds at 80° C. were added to initiate the polymerization. After three hours of the polymerization, the reaction mixture was added with 2.98 g of 2,6-di-t-butyl-4-methylphenol and cooled. The polymerization rate was 35.5%. The acid value of the obtained syrup was 2.5 mgKOH/g.

The syrup was poured into al cold hexane, and the precipitated polymer was purified and vacuum-dried. The acid value of a 10% solution of the dried polymer in methylene chloride was 2.9 mgKOH/g, while the acid value of the solvent methylene chloride was 0.001 mgKOH/g or less.

The weight average molecular weight of the polymer was 51,000 when measured by GPC, and the viscosity of the syrup was 2400 mPa·s at 25° C.

When stored in the dark at 40° C. for one month, the syrup was entirely solidified.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Initial Charge | | | | | | | | |
| methyl methacrylate (g) | 930 | 378 | 1083 | 415 | 1643 | 930 | 930 | 1870 |
| Acrylic acid (g) | 0 | 0 | 0 | 4.8 | 0 | 0 | 0 | 0 |
| Methacrylic acid (g) | 9.4 | 9.4 | 110.7 | 0 | 0 | 9.4 | 9.4 | 9.4 |
| Polymerization inhibitor | — | — | — | — | — | — | — | AIBN |
| (g) | 0 | 0 | 0 | 0 | 0 | 0 | 0 | 0.25 |
| Chain transfer agent | n-DSH | n-DSH | n-DSH | n-OSH | n-OSH | n-DSH | n-DSH | n-DSH |
| (g) | 11.3 | 10.0 | 5.3 | 18.0 | 2.0 | 11.3 | 11.3 | 62.3 |
| After-Charge | | | | | | | | |
| Methyl methacrylate (g) | 940 | 1294 | 1198 | 1312 | 705 | 940 | 940 | 0 |
| Methacrylic acid (g) | 0 | 0 | 0 | 0.8 | 0 | 0 | 0 | 0 |
| Polymerization initiator | ABN-V | ABN-V | ABN-V | ABN-V | PX-16 | PBO | ABN-V | — |
| (g) | 0.14 | 0.49 | 0.10 | 0.09 | 0.14 | 0.10 | 0.14 | 0 |
| Polymerization inhibitor | BHT | BHT | BHT | BX | BX | BHT | — | BHT |
| (g) | 2.98 | 1.00 | 3.50 | 1.50 | 0.50 | 2.98 | 0 | 2.98 |
| After-charge/total starting material (%) | 50 | 80 | 50 | 75 | 30 | 50 | 50 | 0 |
| Reaction temperature (° C.) | 100 | 100 | 102 | 100 | 100 | 100 | 100 | 80 |
| Half-Life (second) | 96 | 96 | 78 | 96 | 25 | 1550 | 96 | 5230 |
| Addition time (hour) | 3.0 | 1.0 | 4.0 | 5.0 | 0.5 | 3.0 | 3.0 | 0 |
| Heating time after addition (hour) | 1.0 | 0.5 | 0.5 | 0.25 | 0.1 | 1.0 | 1.0 | 3.0 |
| Acid value (mgKOH/g) | | | | | | | | |
| Syrup | 2.5 | 2.6 | 30.4 | 10.0 | 0.0 | 2.5 | 2.5 | 2.5 |
| Solid Component | 3.5 | 3.9 | 44.2 | 24.9 | 0.0 | 3.5 | 3.5 | 2.9 |
| Weight average molecular weight | 51000 | 50000 | 104000 | 20000 | 198000 | 51000 | 51000 | 51000 |
| Polymerization rate (wt. %) | 35.1 | 25.7 | 28.0 | 47.2 | 27.1 | 35.0 | 35.1 | 35.5 |

TABLE 1-continued

| | Examples | | | | | Comparative Examples | | |
|---|---|---|---|---|---|---|---|---|
| | 1 | 2 | 3 | 4 | 5 | 1 | 2 | 3 |
| Viscosity (25° C.) (mPa · s) | 2100 | 50 | 10700 | 190 | 19000 | 2100 | 2100 | 2400 |
| Viscosity after storage at 40° C. for one month (mPa · s) | 2200 | 51 | 10600 | 200 | 19000 | solidified | solidified | solidified | n-DSH: 1-dodecanethiol
n-OSH: 1-octanethiol
ABN-V: 2,2'-azobis(2,4-dimethylvaleronitrile)
BHT: 2,6-di-t-butyl-4-methylphenol
BX: 6-t-butyl-2,4-dimethylphenol
AIBN: 2,2'-azobisisobutyronitrile
PX-16: bis(4-t-butylcyclohexyl)peroxydicarbonate
PBO: t-butylperoxy(2-ethylhexanoate)

EXAMPLE 6

Into a 3-liter separable flask equipped with a stirrer, a condenser and a constant delivery pump, 911 g of methyl methacrylate and 28 g of methacrylic acid were charged. After bubbling nitrogen into the mixture for 30 minutes at a flow rate of 100 ml/min (300 volume % based on the monomer mixture), the mixture was heated under nitrogen atmosphere. When the temperature reached 100° C. and the mixture started to be refluxed, 11 g of 1-dodecanethiol were added, and thereafter, a solution comprising 940 g of methyl methacrylate dissolving 0.14 g of 2,2'-azobis(2,4-dimethylvaleronitrile) having a half-life of 96 seconds at 100° C. was added over three hours using the constant delivery pump, while maintaining the refluxing amount at 20 g/min. After the addition, the heating was continued for 0.3 hour. Then, after adding 2.98 g of 2,6-di-t-butyl-4-methylphenol, the reaction mixture was cooled to room temperature under stirring, while allowing air to flow into the flask through the condenser.

The obtained syrup had a polymerization rate of 35.1%, an acid value of 7.4 mgKOH/g, and a viscosity at 25° C. of 2100 mPa·s. The weight average molecular weight of the polymer in the syrup was 51,000 when measured by GPC.

The same preparation of the syrup was repeated three times to obtain syrups having a polymerization rate of 35.1±0.2%, an acid value of 7.4 mgKOH/g for each syrup and a viscosity at 25° C. of 2100±100 mPa·s. The weight average molecular weight of the polymers in the syrups was 51,000 for each syrup when measured by GPC.

EXAMPLE 7

The procedures of Example 6 were repeated except for also bubbling the after-charge with three times by volume of nitrogen and carrying out the process under nitrogen atmosphere without reflux. The obtained syrup has a polymerization rate of 35.1%, an acid value of 7.4 mgKOH/g, and a viscosity at 25° C. of 2100 mPa·s. The weight average molecular weight of the polymer in the syrup was 51,000 when measured by GPC.

The preparation of the syrup was repeated three times to obtain syrups having a polymerization rate of 35.1±0.2%, an acid value of 7.4 mgKOH/g for each syrup and a viscosity at 25° C. of 2100±100 mPa·s. The weight average molecular weight of the polymers in the syrups was 51,000 for each syrup when measured by GPC. The results showed that the obtained syrups had the same quality as in Example 6.

EXAMPLES 8 to 9

By repeating the procedures of Example 6 under the conditions shown in Table 2, respective colorless, transparent methyl methacrylate syrups having the properties shown in Table 2 were prepared.

The preparation of the syrup was repeated three times to obtain syrups having reproducible properties in the polymerization rate, viscosity, and weight average molecular weight.

EXAMPLES 10 to 11

By repeating the procedures of Example 7 under the conditions shown in Table 2, respective colorless, transparent methyl methacrylate syrups having the properties shown in Table 2 were prepared.

The preparation of the syrup as repeated three times to prepare respective syrups. The results show,ed that the process was reproducible in the polymerization rate, viscosity, and weight average molecular weight.

TABLE 2

| | Example 6 | Example 7 | Example 8 | Example 9 | Example 10 | Example 11 |
|---|---|---|---|---|---|---|
| Initial Charge | | | | | | |
| Methyl methacrylate (g) | 911 | 911 | 1000 | 963 | 1000 | 963 |
| Methacrylic acid (g) | 28 | 28 | 0 | 0 | 0 | 0 |
| Methyl acrylate (g) | 0 | 0 | 0 | 20 | 0 | 20 |
| Chain transfer agent n-DSH (g) | 11 | 11 | 6 | 7 | 6 | 7 |
| After-Charge | | | | | | |
| Methyl methacrylate (g) | 940 | 940 | 1000 | 990 | 1000 | 990 |
| Polymerization initiator | ABN-V | ABN-V | ABN-V | PX-16 | ABN-V | PX-16 |
| (g) | 0.14 | 0.14 | 0.16 | 0.09 | 0.16 | 0.09 |

TABLE 2-continued

|  | Example 6 | Example 7 | Example 8 | Example 9 | Example 10 | Example 11 |
|---|---|---|---|---|---|---|
| Polymerization inhibitor BHT (g) | 2.98 | 2.98 | 1.00 | 1.00 | 1.00 | 1.00 |
| Reaction Conditions | | | | | | |
| Reaction temperature (° C.) | 100 | 100 | 100 | 100 | 100 | 100 |
| Half-Life (second) | 96 | 96 | 96 | 25 | 96 | 25 |
| Nitrogen replacement | | | | | | |
| initial charge | yes | yes | yes | yes | yes | yes |
| after-charge | no | yes | no | no | yes | yes |
| Refluxing amount (g/min) | 20 | 0 | 30 | 15 | 0 | 0 |
| Reflux ratio to reaction liquid (%/min) | 2.1–1.0 | 0 | 3.0–1.5 | 1.5–0.8 | 0 | 0 |
| Addition time (hour) | 3.0 | 3.0 | 2.3 | 4.5 | 2.3 | 4.5 |
| Heating time after addition (hour) | 0.3 | 0.3 | 0.2 | 0.1 | 0.2 | 0.1 |
| Properties of Syrups | | | | | | |
| Polymerization rate (wt. %) | 35.1 | 35.1 | 34.1 | 30.5 | 34.1 | 30.5 |
| Acid value (mgKOH/g) | 7.4 | 7.4 | zero | zero | zero | zero |
| Viscosity (25° C.) (mPa · s) | 2100 | 2100 | 8900 | 1100 | 8900 | 1100 |
| Weight average molecular weight | 51000 | 51000 | 10.1 | 80000 | 10.1 | 80000 |
| Reproducitivity | good | good | good | good | good | good | n-DSH: 1-dodecanethiol
ABN-V: 2,2'-azobis(2,4-dimethylvaleronitrile)
BHT: 2,6-di-t-butyl-4-methylphenol
PX-16: bis(4-t-butylcyelohexyl) peroxydicarbonate

EXAMPLE 12

Into a 3-liter separable flask equipped with a stirrer, a condenser and a constant delivery pump, 911 g of methyl methacrylate and 28 g of methacrylic acid were charged without nitrogen bubbling. The mixture was heated from 25° C. to 100° C. over 40 minutes to start the reflux. At the start of the reflux, the mixture was added with 11 g of 1-dodecanethiol, and thereafter, added with a solution comprising 940 g of methyl methacrylate dissolving 0.14 g of 2,2'-azobis(2,4-dimethylvaleronitrile) having a half-life of 96 seconds at 100° C. over three hours using the constant delivery pump, while maintaining the refluxing amount at 20 g/min. After the addition, the heating was continued for 0.3 hour. Then, the reaction mixture was added with 2.98 g of 2,6-di-t-butyl-4-methylphenol, and cooled to room temperature under stirring while allowing air to flow into the flack through the condenser.

The obtained syrup had a polymerization rate of 35.1%, an acid value of 7.4 mgKOH/g, and a viscosity at 25° C. of 2100 mPa·s. The weight average molecular weight of the polymer in the syrup was 51,000 when measured by GPC.

The same preparation of the syrup was repeated three times to obtain syrups having a polymerization rate of 35.1±0.2%, an acid value of 7.4 mgKOH/g for each syrup and a viscosity at 25° C. of 2100±100 mPa·s. The weight average molecular weight of the polymers in the syrups was 51,000 for each syrup when measured by GPC.

EXAMPLE 13

The procedures of Example 12 were repeated except for bubbling the starting material with three times by volume of nitrogen before heating and carrying out the process under nitrogen atmosphere without reflux.

The obtained syrup had a polymerization rate of 35.1%, an acid value of 7.4 mgKOH/g, and a viscosity at 25° C. of 2100 mPa·s. The weight average molecular weight of the polymer in the syrup was 51,000 when measured by GPC.

The preparation of the syrup was repeated three times to obtain syrups having a polymerization rate of 35.1±0.2%, an acid value of 7.4 mgKOH/g for each syrup and a viscosity at 25° C. of 2100±100 mPa·s. The weight average molecular weight of the polymers in the syrups was 51,000 for each syrup when measured by GPC. The results showed that the obtained syrups had the same quality as in Example 12.

EXAMPLES 14 to 15

By repeating the procedures of Example 12 under the conditions shown in Table 3, respective colorless, transparent methyl methacrylate syrups having the properties shown in Table 3 were prepared.

The preparation of the syrup was repeated three times to obtain syrups having reproducible properties in the polymerization rate, viscosity, and weight average molecular weight.

EXAMPLES 16 to 17

By repeating the procedures of Example 13 under the conditions shown in Table 3, respective colorless, transparent methyl methacrylate syrups having the properties shown in Table 3 were prepared.

The preparation of the syrup was repeated three times to pep are the polymerization rate, viscosity, and weight average molecular weight.

TABLE 3

|  | Example 12 | Example 13 | Example 14 | Example 15 | Example 16 | Example 17 |
|---|---|---|---|---|---|---|
| Initial Charge | | | | | | |
| Methyl methacrylate (g) | 911 | 911 | 1000 | 963 | 1000 | 963 |
| Methacrylic acid (g) | 28 | 28 | 0 | 0 | 0 | 0 |
| Methyl acrylate (g) | 0 | 0 | 0 | 20 | 0 | 20 |
| Chain transfer agent n-DSH (g) | 11 | 11 | 6 | 7 | 6 | 7 |
| After-Charge | | | | | | |
| Methyl methacrylate (g) | 940 | 940 | 1000 | 990 | 1000 | 990 |
| Polymerization initiator | ABN-V | ABN-V | ABN-V | PX-16 | ABN-V | PX-16 |
| (g) | 0.14 | 0.14 | 0.16 | 0.09 | 0.16 | 0.09 |
| Polymerization inhibitor BHT (g) | 2.98 | 2.98 | 1.00 | 1.00 | 1.00 | 1.00 |
| Reaction Conditions | | | | | | |
| Temperature elevation time (min) | 40 | 40 | 70 | 30 | 70 | 30 |
| Reaction temperature (° C.) | 100 | 100 | 100 | 100 | 100 | 100 |
| Half-Life (second) | 96 | 96 | 96 | 25 | 96 | 25 |
| Nitrogen replacement | | | | | | |
| initial charge | no | yes | no | no | yes | yes |
| after-charge | no | yes | no | no | yes | yes |
| Refluxing amount (g/min) | 20 | 0 | 30 | 15 | 0 | 0 |
| Reflux ratio to reaction liquid (%/min) | 2.1–1.0 | 0 | 3.0–1.5 | 1.5–0.8 | 0 | 0 |
| Addition time (hour) | 3.0 | 3.0 | 2.3 | 4.5 | 2.3 | 4.5 |
| Heating time after addition (hour) | 0.3 | 0.3 | 0.2 | 0.1 | 0.2 | 0.1 |
| Properties of Syrups | | | | | | |
| Polymerization rate (wt. %) | 35.1 | 35.1 | 34.1 | 30.5 | 34.1 | 30.5 |
| Acid value (mgKOH/g) | 7.4 | 7.4 | zero | zero | zero | zero |
| Viscosity (25° C.) (mPa · s) | 2100 | 2100 | 8900 | 1100 | 8900 | 1100 |
| Weight average molecular weight | 51000 | 51000 | 10.1 | 80000 | 10.1 | 80000 |
| Reproducitivity | good | good | good | good | good | good | n-DSH: 1-dodecanethiol
ABN-V: 2,2'-azobis(2,4-dimethylvaleronitrile)
BHT: 2,6-di-t-butyl-4-methylphenol
PX-16: bis(4-t-butylcyelohexyl) peroxydicarbonate

EXAMPLE 18

Into a 1.5-liter four-necked separable flask equipped with a thermometer, a reflux condenser, a constant delivery pump and a stirrer, a mixture comprising 458 g of methyl methacrylate, 10.9 g of methacrylic acid and 0.090 g of a polymer derived from a monomer mixture mainly comprising butadiene (available from BYK Chemie Japan Co., Ltd. under trade name of BYK-A515) was charged and heated under stirring at 100 rpm. When the temperature reached 100° C., the mixture was added rapidly with 2.6 g of 1-dodecanethiol as the chain transfer agent, and then added dropwise with a solution comprising 472 g of methyl methacrylate dissolving 0.058 g of 2,2'-azobis(2,4-dimethylvaleronitrile) as the polymerization initiator over three hours using the constant delivery pump at a dropping speed of 2.6 g/min. After the dropping, the heating was continued for 0.15 hour, and then, 0.2 g of 2,6-di-t-butyl-4-methylphenol was added as the polymerization inhibitor to inhibit the polymerization. Thereafter, the reaction mixture was cooled to room temperature to obtain a colorless, transparent methyl-methacrylate syrup. During the preparation, the viscosity of the reaction mixture increased as the polymerization proceeded to produce foams. However, the foams thus produced were immediately broken at the liquid surface and no foam was noticed at a later stage of polymerization and at the completion of polymerization.

The obtained syrup had a polymerization rate of 31.3% and a viscosity at 25° C. of 4200 mPa·s. The weight average molecular weight was 103,000 when measured by GPC.

EXAMPLE 19

In the same manner as in Example 18 except for using 0.045 g of BYK-A515 instead of 0.09 g of BYK-A515, a colorless, transparent methyl methacrylate syrup was prepared. Although the reaction mixture was foamed as the polymerization proceeded, the foams produced easily disappeared into the atmosphere in the flask, and no foam was noticed at the completion of polymerization.

The obtained syrup had a polymerization rate of 31.4% and a viscosity at 25° C. of 4700 mPa·s. The weight average molecular weight of the polymer in the syrup was 100,000 when measured by GPC.

EXAMPLE 20

In the same manner as in Example 18 except for using 2.83 g of stearic monoglyceride instead of 0.09 g of BYK-A515, a colorless, transparent methyl methacrylate syrup was prepared. Although the reaction mixture was foamed as the polymerization proceeded, the foams produced easily disappeared into the atmosphere in the flask, and no foam was noticed at the completion of polymerization.

The obtained syrup had a polymerization rate of 32.2% and a viscosity at 25° C. of 6100 mPa·s. The weight average molecular weight of the polymer in the syrup was 100,000 when measured by GPC.

EXAMPLE 21

In the same manner as in Example 18 except for using 2.83 g of caprylic monoglyceride instead of 0.09 g of BYK-A515, a colorless, transparent methyl methacrylate syrup was prepared. Although the reaction mixture was foamed as the polymerization proceeded, the foams produced easily disappeared into the atmosphere in the flask, and no foam was noticed at the completion of polymerization.

The obtained syrup had a polymerization rate of 33.0% and a viscosity at 25° C. of 6,000 mPa·s. The weight average molecular weight of the polymer in the syrup was 100,000 when measured by GPC.

EXAMPLE 22

Into the same apparatus as in Example 18, a mixture comprising 458 g of methyl methacrylate, 10.9 g of methacrylic acid and 0.090 g of BYK-A515 was charged and heated under stirring at 100 rpm. When the temperature reached 101° C., the mixture was added rapidly with 1.1 g of 1-dodecanethiol as the chain transfer agent, and then added with a solution comprising 472 g of methyl methacrylate dissolving 0.030 g of 2,2'-azobis(2,4-dimethylvaleronitrile) as the polymerization initiator over three hours using the constant delivery pump. After the addition, the heating was continued for 0.25 hour, and then, 0.2 g of 6-t-butyl-2,4-dimethylphenol was added as the polymerization inhibitor to inhibit the polymerization. Thereafter, the reaction mixture was cooled to room temperature to obtain a colorless, transparent methyl methacrylate syrup. During the preparation, the viscosity of the reaction mixture increased as the polymerization proceeded to produce foams. However, the foams thus produced were immediately broken at the liquid surface and no foam was noticed at a later stage of polymerization and at the completion of polymerization.

The obtained syrup had a polymerization rate of 24.3% and a viscosity at 25° C. of 6100 mPa·s. The weight average molecular weight was 203,000 when measured by GPC.

EXAMPLE 23

Into the same apparatus as in Example 18, a mixture comprising 472 g of methyl methacrylate and 2.83 g of oleic monoglyceride was charged and heated under stirring at 80 rpm. When the temperature reached 101° C., the mixture was added with 3.4 g of 1-dodecanethiol as the chain transfer agent, and then added with a solution comprising 472 g of methyl methacrylate dissolving 0.041 g of 2,2'-azobis(2,4-dimethylvaleronitrile) as the polymerization initiator over three hours using the constant delivery pump. After the addition, the heating was continued for 0.25 hour, and then, 0.5 g of 2,6-di-t-butyl-4-methylphenol was added as the polymerization inhibitor to inhibit the polymerization. Thereafter, the reaction mixture was cooled to room temperature to obtain a colorless, transparent methyl methacrylate syrup. During the preparation, the viscosity of the reaction mixture increased as the polymerization proceeded to produce foams. However, the foams thus produced were immediately broken at the liquid surface and no foam was noticed at a later stage of polymerization and at the completion of polymerization.

The obtained syrup has a polymerization rate of 27.6% and a viscosity at 25° C. of 500 mPa·s. The weight average molecular weight was 79,000 when measured by GPC.

EXAMPLE 24

Into the same apparatus as in Example 18, a mixture comprising 472 g of methyl methacrylate and 0.090 g of BYK-A515 was charged and heated under stirring at 100 rpm. When the temperature reached 101° C., the mixture was added with 3.4 g of 1-dodecanethiol as the chain transfer agent, and then added with a solution comprising 472 g of methyl methacrylate dissolving 0.102 g of 2,2'-azobis(2,4-dimethylvaleronitrile) as the polymerization initiator over three hours using the constant delivery pump. After the addition, the heating was continued for 0.25 hour, and then, 1.0 g of 2,6-di-t-butyl-4-methylphenol was added as the polymerization inhibitor to inhibit the polymerization. Thereafter, the reaction mixture was cooled to room temperature to obtain a colorless, transparent methyl methacrylate syrup. During the preparation, the viscosity of the reaction mixture increased as the polymerization proceeded to produce foams. However, the foams thus produced were immediately broken at the liquid surface and no foam was noticed at a later stage of polymerization and the completion of polymerization.

The obtained syrup has a polymerization rate of 40.4% and a viscosity at 25° C. of 50,000 mPa·s. The weight average molecular weight was 80,000 when measured by GPC.

What is claimed is:

1. A method for producing a methyl methacrylate syrup having a viscosity of 10 to 500,000 mPa·s at 25° C. and containing a polymer having a weight average molecular weight of 20,000 to 500,000 when measured by gel permeation chromatography, the method comprising the steps of:
   (1) preparing a starting material comprising methyl methacrylate or a monomer mixture mainly comprising methyl methacrylate, and dividing the starting material into 20 to 70% by, weight of an initial charge and 30 to 80% by weight of an after-charge;
   (2) heating the initial charge in a reactor;
   (3) adding a whole portion of a chain transfer agent at the time when the initial charge reaches a reaction temperature;
   (4) adding the after-charge over 0.1 to 10 hours together with a polymerization initiator having a half-life of 10 to 300 seconds at the reaction temperature;
   (5) continuing the heating after the addition of the after-charge and the polymerization initiator is completed; and
   (6) adding a hindered phenol polymerization inhibitor at the time the heating is finished.

2. The method according to claim 1, wherein the reaction temperature is 95 to 110° C.

3. The method according to claim 1, wherein the reaction temperature is the reflux temperature of the mixture in the reaction system.

4. The method according to claim 1, wherein the initial charge in the reactor is contacted with nitrogen in an amount of 200 to 1000 volume % based on the initial charge to replace dissolved oxygen therein, and heated to the reflux temperature of the mixture in the reaction system to permit the mixture to reflux; and then the addition of the chain transfer agent is made.

5. The method according to claim 1, wherein the addition of the chain transfer agent is made after heating the initial charge in the reactor from room temperature to the boiling point of the mixture in the reaction system within two hours, thereby permitting the initial charge to reflux.

6. The method according to claim 1, wherein the initial charge in the reactor is added with an anti-foaming agent, and heated to the boiling point of the mixture in the reaction system; and then the addition of the chain transfer agent is made.

7. The method according to claim 6, wherein the antifoaming agent is at least one compound selected from the group consisting of a partial ester of $C_1$–$C_{30}$ fatty acid and glycerin and a polymer derived from a monomer mixture mainly comprising butadiene, and an addition amount thereof is 0.0001 to 0.3% by weight based on the total amount of the starting material.

8. The method according to claim 1, wherein the addition of the after-charge and the polymerization initiator is started at a time within zero to 60 minutes after the addition of the chain transfer agent.

9. The method according to claim 1, wherein the chain transfer agent is at least one compound selected from the group consisting of mercaptans having 4 to 20 carbon atoms.

10. The method according to claim 1, wherein the addition amount of the chain transfer agent is 0.0005 to 3.0% by weight based on the total amount of the starting material.

11. The method according to claim 1, wherein the polymerization initiator is at least one compound selected from the group consisting of 2,2'-azobis(2,4-dimethylvaleronitrile), 2,2'-azobis(2,4-dimethyl-4-methoxyvaleronitrile), 1,1'-azobiscyclohexanecarbonitrile, lauroyl peroxide, benzoyl peroxide, t-butyl peroxypivalate, t-butyl peroxy-2-ethylhexanoate, t-amyl peroxy-2-ethylhexanoate, diisopropyl peroxydicarbonate and bis(4-t-butylcyclohexyl) peroxydicarbonate.

12. The method according to claim 1, wherein the addition amount of the polymerization initiator is $5\times10^{-5}$ to 2% by weight based on the total amount of the starting material.

13. The method according to claim 1, wherein the heating of the step (5) is continued for a period of time sufficient for decomposing 99% by weight or more of the polymerization initiator.

14. The method according to claim 1, wherein the addition amount of the hindered phenol polymerization inhibitor is 0.001 to 1.0% by weight based on the total amount of the starting material.

15. The method according to claim 1, wherein the monomer mixture mainly comprising methyl methacrylate comprises methyl methacrylate in an amount of larger than 50% by weight and at least one comonomer copolymerizable with methyl methacrylate in an amount of smaller than 50% by weight.

16. The method according to claim 15, wherein the comonomer copolymerizable with methyl methacrylate is at least one compound selected from the group consisting of an unsaturated carboxylic acid; an ester of an unsaturated carboxylic acid other,than methyl methacrylate; an unsaturated nitrile; an unsaturated carboxylic nitrile; an unsaturated carboxylic amide; an unsaturated carboxylic imide; an unsaturated carboxylic anhydride; an aromatic vinyl compound; and a vinyl carboxylate.

* * * * *